US012042454B2

(12) United States Patent
Lee et al.

(10) Patent No.: US 12,042,454 B2
(45) Date of Patent: Jul. 23, 2024

(54) PRONE POSITION VENTILATION HEALTH BED

(71) Applicants: Chun-Hsin Lee, Changhua (TW); Ting-An Lee, Changhua (TW)

(72) Inventors: Chun-Hsin Lee, Changhua (TW); Ting-An Lee, Changhua (TW)

( * ) Notice: Subject to any disclaimer, the term of this patent is extended or adjusted under 35 U.S.C. 154(b) by 246 days.

(21) Appl. No.: 17/867,769

(22) Filed: Jul. 19, 2022

(65) Prior Publication Data

US 2024/0024181 A1 Jan. 25, 2024

(51) Int. Cl.
*A61G 7/07* (2006.01)
*A61G 7/015* (2006.01)

(52) U.S. Cl.
CPC ............... *A61G 7/07* (2013.01); *A61G 7/015* (2013.01)

(58) Field of Classification Search
USPC ..................... 248/354.4, 316.1, 229.1, 229.2
See application file for complete search history.

(56) References Cited

U.S. PATENT DOCUMENTS

2020/0359804 A1* 11/2020 Lee ...................... A47C 19/122

FOREIGN PATENT DOCUMENTS

TW M463079 U * 10/2013
TW M604190 U * 11/2020

* cited by examiner

*Primary Examiner* — Adam C Ortiz
(74) *Attorney, Agent, or Firm* — Chun-Ming Shih; LANAWY IPR SERVICES

(57) ABSTRACT

A prone position ventilation health bed includes a front bedstead pivotally connected with a rear bedstead. The frame includes two side bars and a front crossbar connecting the two side bars. Two parallel fixed bars are transversely mounted between the two side bars. A head and face support rack is transversely arranged and movable between the front crossbar and one of the two fixed bars. A left chest and abdomen support rack and a right chest and abdomen support rack are longitudinally arranged between the two fixed bars. The left chest and abdomen support rack and the right chest and abdomen support rack are parallel with each other and are movable between the two fixed bars. Thus, the user's head, face, chest, and abdomen are exposed outward without being pressed when the user is situated at the prone position.

6 Claims, 10 Drawing Sheets

PRONE POSITION VENTILATION HEALTH BED

BACKGROUND OF THE INVENTION

1. Field of the Invention

The present invention relates to a bed and, more particularly, to a prone position ventilation health (or hospital or medical or nursing) bed.

2. Description of the Related Art

In general, when performing an operation in a hospital operating room on the rear part of the body of a patient, including the back, the spine, the buttocks or the legs, the patient needs to be situated at a prone position so that the front part of the patient's body presses the bed constantly. However, there is no equipment for exposing the patient when the patient is situated at the prone position, thereby easily causing an uncomfortable sensation to the patient. In addition, the patient's nose and mouth are pressed by the bed, thereby affecting the breathing condition. Further, the patient's face, ears, skin, chest, and abdomen are pressed by the bed constantly, thereby easily causing a pressure sore. Thus, multiple cushions are used to support the patient's front body to prevent the patient's cheeks, ears, chest, abdomen, and private parts from directly touching the bed. However, the patient easily feels uncomfortable when being compressed by the cushions constantly.

BRIEF SUMMARY OF THE INVENTION

In accordance with the present invention, there is provided a prone position ventilation health bed comprising a rear bedstead and a front bedstead. The rear bedstead has a bottom provided with a stand. The front bedstead is pivotally connected with a front portion of the rear bedstead. The front bedstead includes a frame. The frame includes two side bars and a front crossbar connecting the two side bars. The front crossbar is located at a front end of each of the two side bars. The two side bars and the front crossbar construct a rectangular structure. Two parallel fixed bars are transversely mounted between the two side bars. A head and face support rack is transversely arranged between the front crossbar and one of the two fixed bars. The head and face support rack is movable between the front crossbar and one of the two fixed bars. The head and face support rack has a first end provided with a first securing member provided with a first receiving groove mounted on one of the two side bars. The first receiving groove is formed in the first securing member longitudinally and has an opening directed downward. A first fastening bolt extends through the first securing member axially and is moved to press one of the two side bars so that the head and face support rack is fixed. The head and face support rack has a second end longitudinally provided with a first limit member provided with a first receiving slot mounted on the other one of the two side bars. The first receiving slot is formed in the first limit member longitudinally and has an opening directed downward. The first limit member has a bottom provided with a first limit piece arranged transversely and directed inward. When the first fastening bolt presses one of the two side bars, the first limit piece is located under the other one of the two side bars, and the head and face support rack is limited. A left chest and abdomen support rack and a right chest and abdomen support rack are longitudinally arranged between the two fixed bars. The left chest and abdomen support rack and the right chest and abdomen support rack are parallel with each other and are movable between the two fixed bars. The left chest and abdomen support rack has a first end provided with a second securing member provided with a second receiving groove mounted on one of the two fixed bars. The second receiving groove is formed in the second securing member transversely and has an opening directed downward. A second fastening bolt extends through the first second securing member axially and is moved to press one of the two fixed bars so that the left chest and abdomen support rack is fixed. The left chest and abdomen support rack has a second end transversely provided with a second limit member provided with a second receiving slot mounted on the other one of the two fixed bars. The second receiving slot is formed in the second limit member transversely and has an opening directed downward. The second limit member has a bottom provided with a second limit piece arranged longitudinally and directed inward. When the second fastening bolt presses one of the two fixed bars, the second limit piece is located under the other one of the two fixed bars, and the left chest and abdomen support rack is limited. The right chest and abdomen support rack has a first end provided with a third securing member provided with a third receiving groove mounted on one of the two fixed bars. The third receiving groove is formed in the third securing member transversely and has an opening directed downward. A third fastening bolt extends through the first third securing member axially and is moved to press one of the two fixed bars so that the right chest and abdomen support rack is fixed. The right chest and abdomen support rack has a second end transversely provided with a third limit member provided with a third receiving slot mounted on the other one of the two fixed bars. The third receiving slot is formed in the third limit member transversely and has an opening directed downward. The third limit member has a bottom provided with a third limit piece arranged longitudinally and directed inward. When the third fastening bolt presses one of the two fixed bars, the third limit piece is located under the other one of the two fixed bars, and the right chest and abdomen support rack is limited.

According to the primary advantage of the present invention, the prone position ventilation health bed provides a comfortable and ventilating sensation to a user when being situated at a prone position.

According to another advantage of the present invention, the gap of the head and the face is adjusted conveniently, and the gap of the chest and the abdomen is also adjusted conveniently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
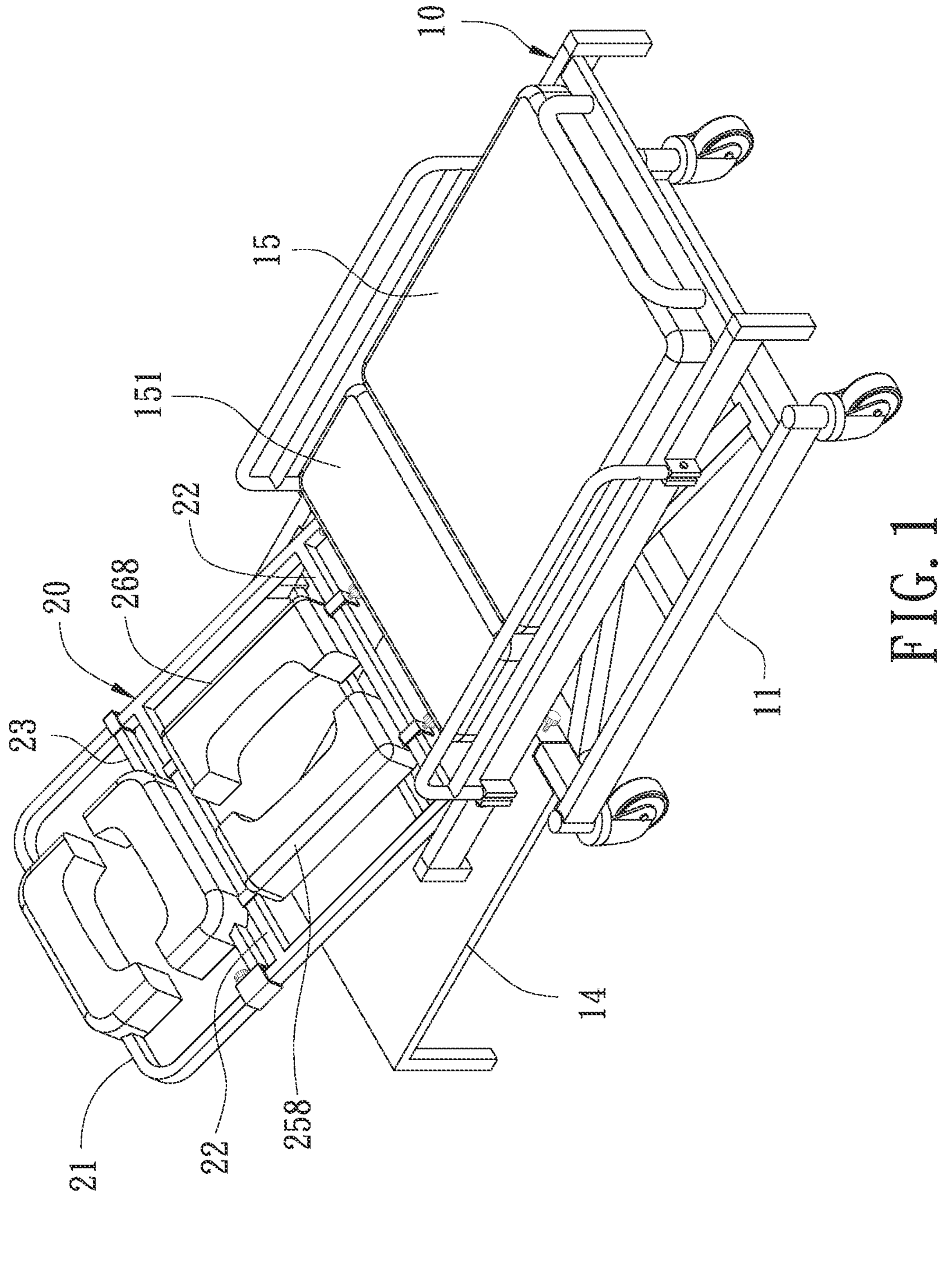
FIG. 1 is a perspective view of a prone position ventilation health bed in accordance with the preferred embodiment of the present invention.
Figure 2:
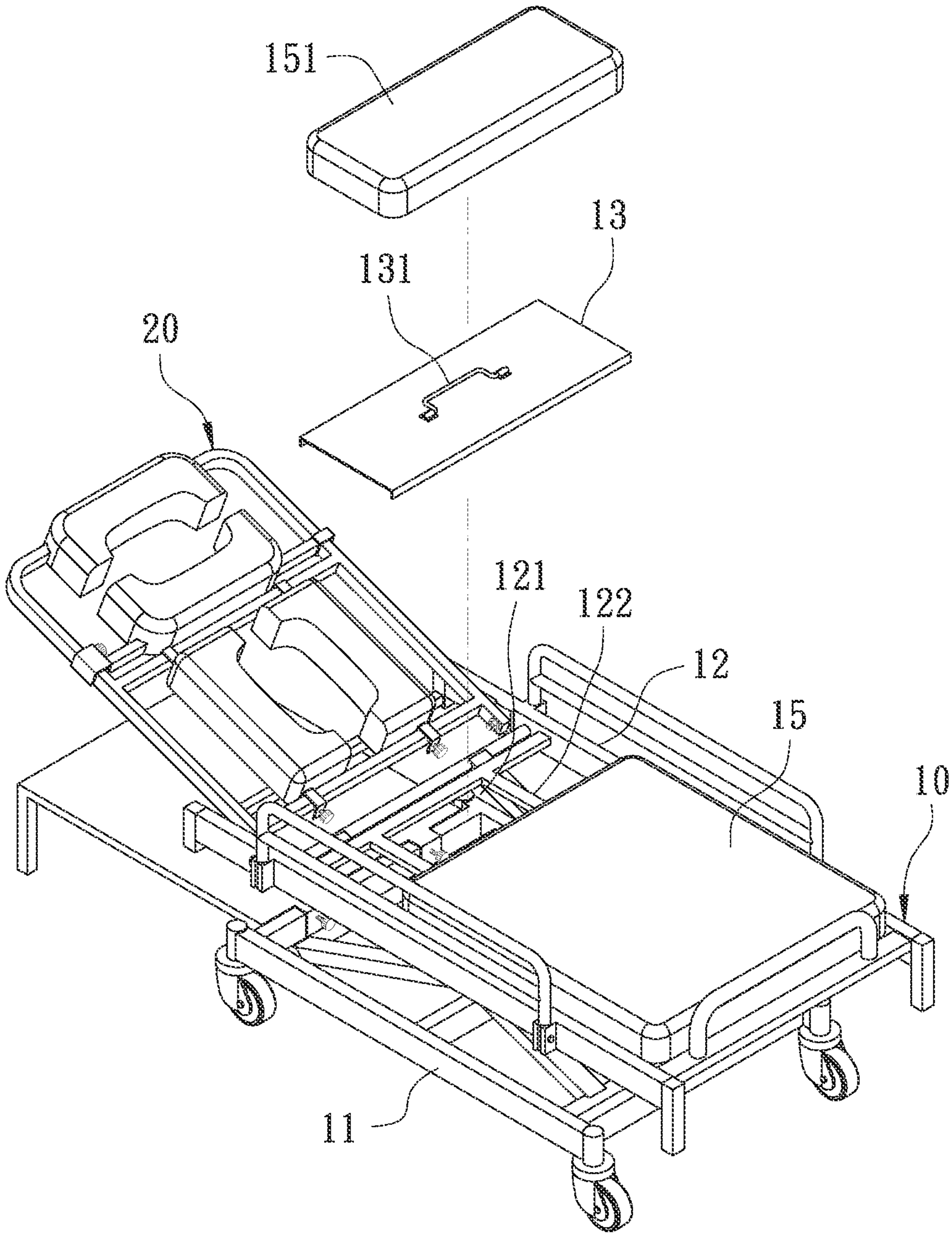
FIG. 2 is a partial exploded perspective view of the prone position ventilation health bed in accordance with the preferred embodiment of the present invention.
Figure 3:
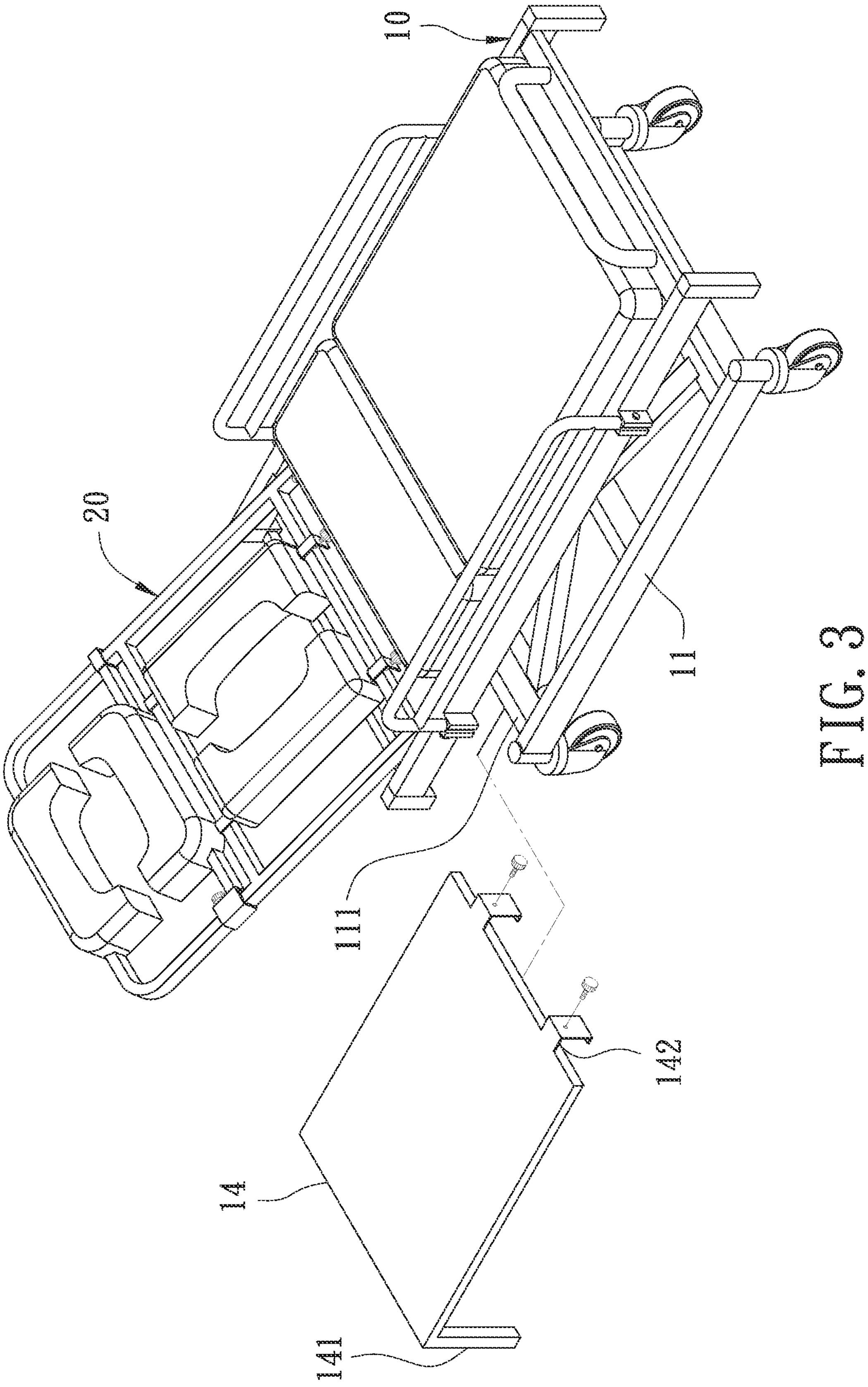
FIG. 3 is a partial exploded perspective view of the prone position ventilation health bed in accordance with the preferred embodiment of the present invention.
Figure 4:
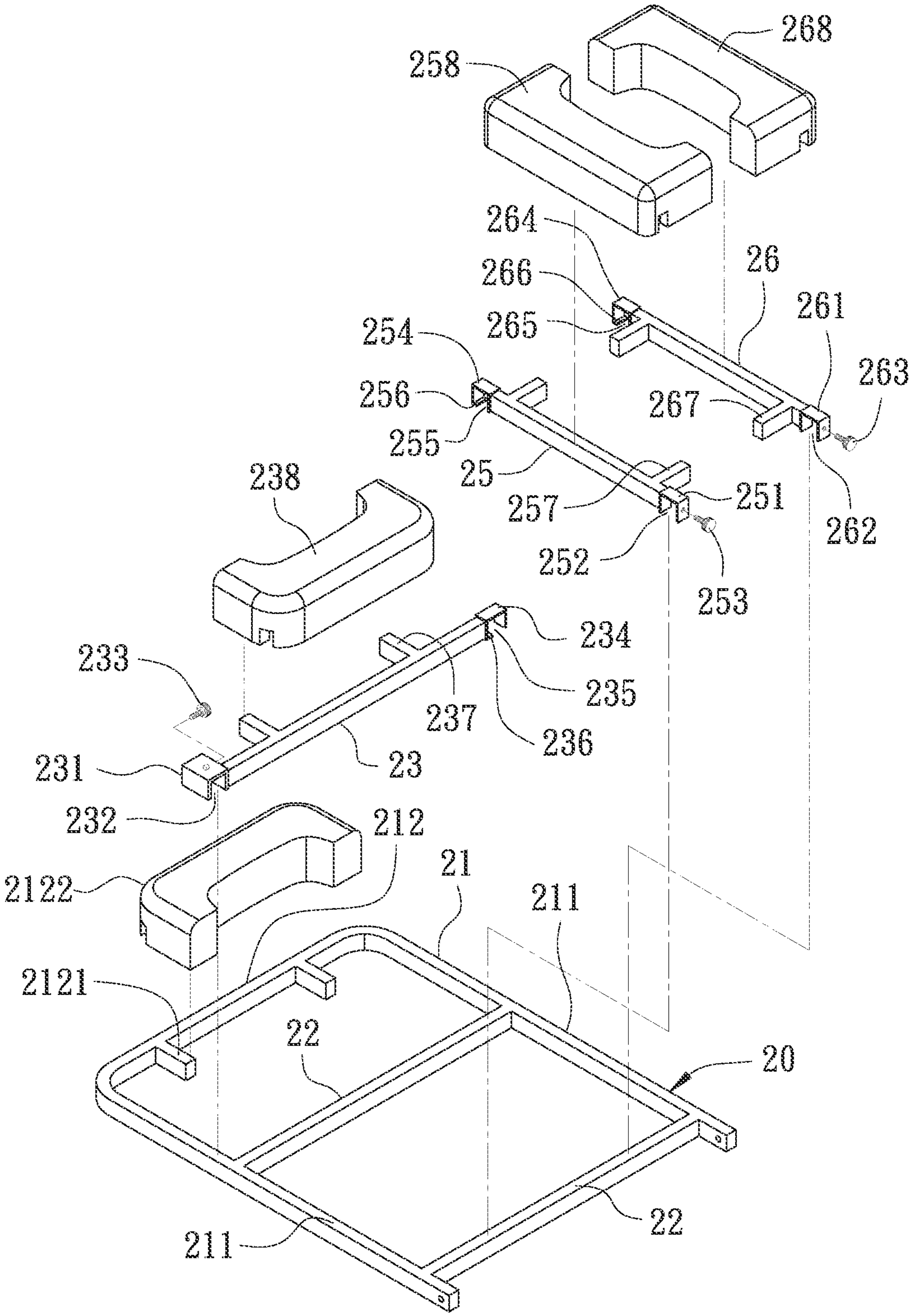
FIG. 4 is an exploded perspective view of a front bedstead of the prone position ventilation health bed in accordance with the preferred embodiment of the present invention.

Referring to the drawings and initially to FIGS. 1-10, a prone position ventilation health bed in accordance with the preferred embodiment of the present invention comprises a rear bedstead 10 and a front bedstead 20.

The rear bedstead 10 has a bottom provided with a stand 11. The stand 11 is movable and allows lifting operation.

The front bedstead 20 is pivotally connected with a front portion of the rear bedstead 10. Thus, the inclined angle of the front bedstead 20 can be adjusted. The front bedstead 20 includes a frame 21 which is constructed by rectangular pipes. The frame 21 includes two side bars 211 and a front crossbar 212 connecting the two side bars 211. The front crossbar 212 is located at a front end of each of the two side bars 211. The two side bars 211 and the front crossbar 212 construct a rectangular structure. Two parallel fixed bars 22 are transversely mounted between the two side bars 211.

A head and face support rack 23 is transversely arranged between the front crossbar 212 and one of the two fixed bars 22. The head and face support rack 23 is movable between the front crossbar 212 and one of the two fixed bars 22. The head and face support rack 23 has a first end provided with a first securing member 231 provided with a first receiving groove 232 mounted on one of the two side bars 211. The first receiving groove 232 is formed in the first securing member 231 longitudinally and has an opening directed downward. A first fastening bolt 233 extends through the first securing member 231 axially and is moved to press one of the two side bars 211 so that the head and face support rack 23 is fixed. The head and face support rack 23 has a second end longitudinally provided with a first limit member 234 provided with a first receiving slot 235 mounted on the other one of the two side bars 211. The first receiving slot 235 is formed in the first limit member 234 longitudinally and has an opening directed downward. The first limit member 234 has a bottom provided with a first limit piece 236 arranged transversely and directed inward.

Figure 5:
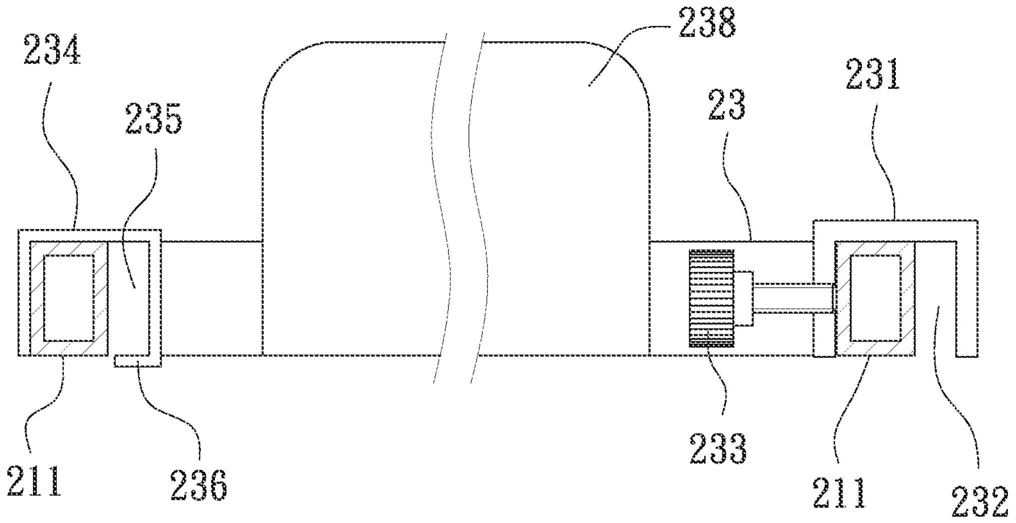
FIG. 5 is a partial cross-sectional view of the prone position ventilation health bed in accordance with the preferred embodiment of the present invention.
Figure 6:
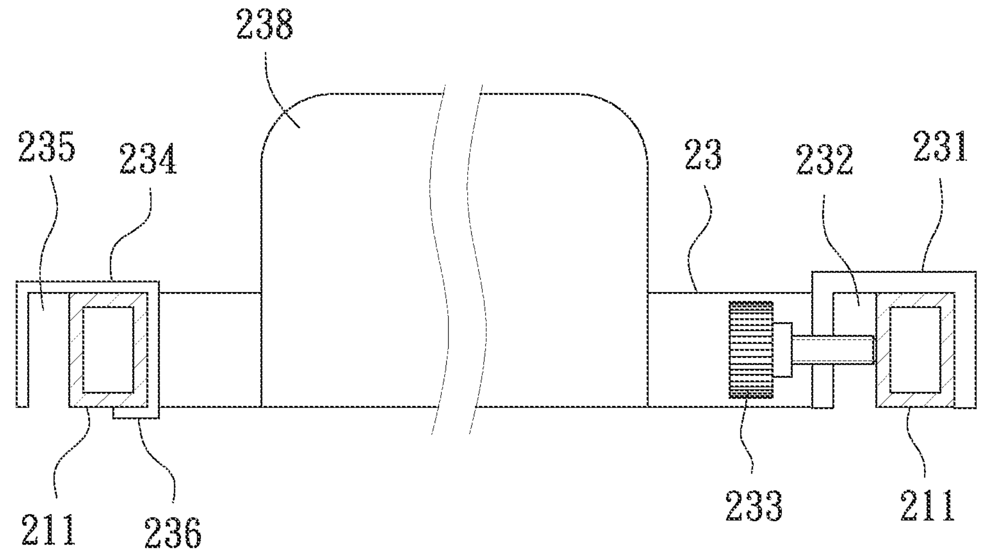
FIG. 6 is a schematic operational view of the prone position ventilation health bed as shown in FIG. 5.

Before the first fastening bolt 233 presses one of the two side bars 211, the first limit piece 236 is spaced from the other one of the two side bars 211 as shown in FIG. 5. When the first fastening bolt 233 presses one of the two side bars 211, the head and face support rack 23 is driven and moved by the first fastening bolt 233 so that the first limit piece 236 is located under the other one of the two side bars 211 as shown in FIG. 6, and the head and face support rack 23 is limited and supported.

A left chest and abdomen support rack 25 and a right chest and abdomen support rack 26 are longitudinally arranged between the two fixed bars 22. The left chest and abdomen support rack 25 and the right chest and abdomen support rack 26 are parallel with each other and are movable between the two fixed bars 22.

The left chest and abdomen support rack 25 has a first end provided with a second securing member 251 provided with a second receiving groove 252 mounted on one of the two fixed bars 22. The second receiving groove 252 is formed in the second securing member 251 transversely and has an opening directed downward. A second fastening bolt 253 extends through the first second securing member 251 axially and is moved to press one of the two fixed bars 22 so that the left chest and abdomen support rack 25 is fixed. The left chest and abdomen support rack 25 has a second end transversely provided with a second limit member 254 provided with a second receiving slot 255 mounted on the other one of the two fixed bars 22. The second receiving slot 255 is formed in the second limit member 254 transversely and has an opening directed downward. The second limit member 254 has a bottom provided with a second limit piece 256 arranged longitudinally and directed inward.

Figure 7:
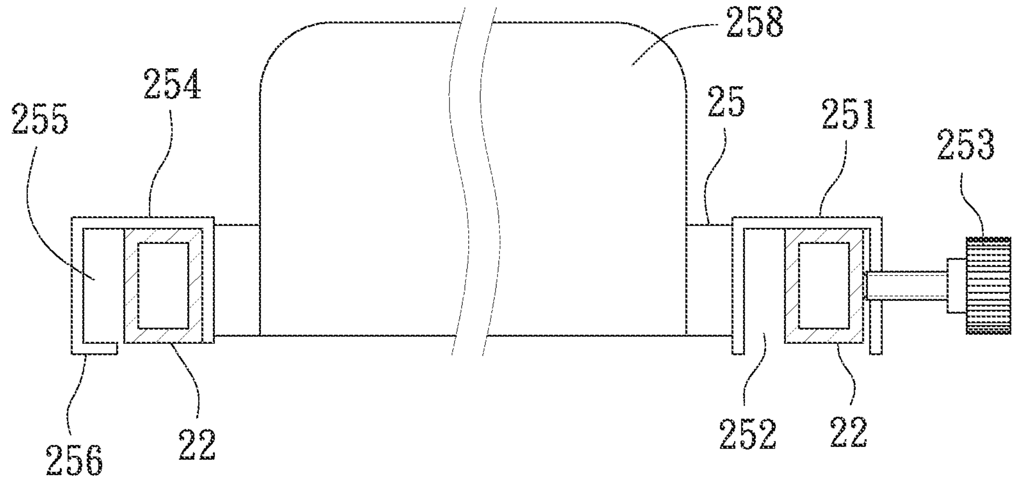
FIG. 7 is a partial cross-sectional view of the prone position ventilation health bed in accordance with the preferred embodiment of the present invention.
Figure 8:
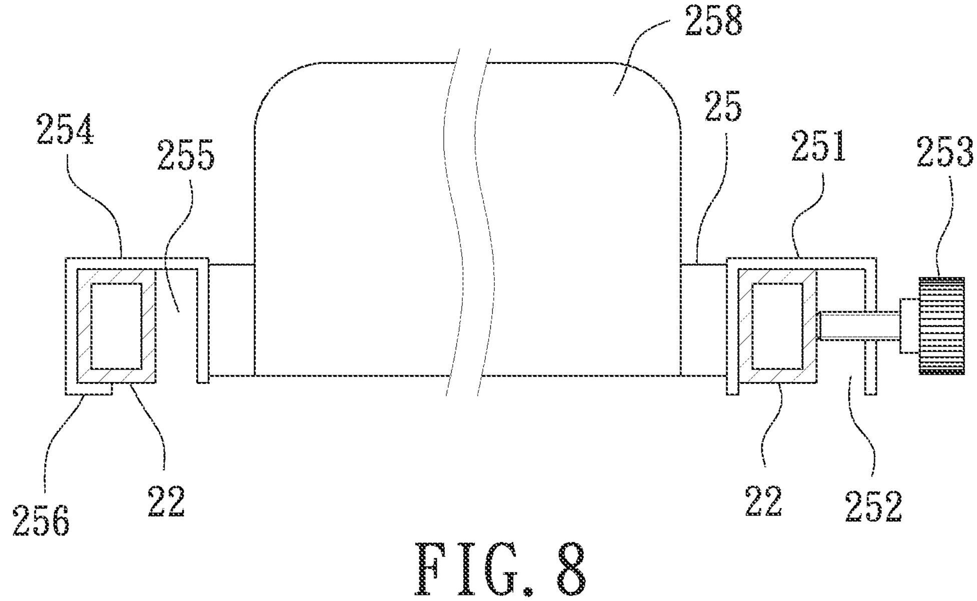
FIG. 8 is a schematic operational view of the prone position ventilation health bed as shown in FIG. 7.

Before the second fastening bolt 253 presses one of the two fixed bars 22, the second limit piece 256 is spaced from the other one of the two fixed bars 22 as shown in FIG. 7. When the second fastening bolt 253 presses one of the two fixed bars 22, the left chest and abdomen support rack 25 is driven and moved by the second fastening bolt 253 so that the second limit piece 256 is located under the other one of the two fixed bars 22 as shown in FIG. 8, and the left chest and abdomen support rack 25 is limited and supported.

The right chest and abdomen support rack 26 has a first end provided with a third securing member 261 provided with a third receiving groove 262 mounted on one of the two fixed bars 22. The third receiving groove 262 is formed in the third securing member 261 transversely and has an opening directed downward. A third fastening bolt 263 extends through the first third securing member 261 axially and is moved to press one of the two fixed bars 22 so that the right chest and abdomen support rack 26 is fixed. The right chest and abdomen support rack 26 has a second end transversely provided with a third limit member 264 provided with a third receiving slot 265 mounted on the other one of the two fixed bars 22. The third receiving slot 265 is formed in the third limit member 264 transversely and has an opening directed downward. The third limit member 264 has a bottom provided with a third limit piece 266 arranged longitudinally and directed inward.

Figure 9:
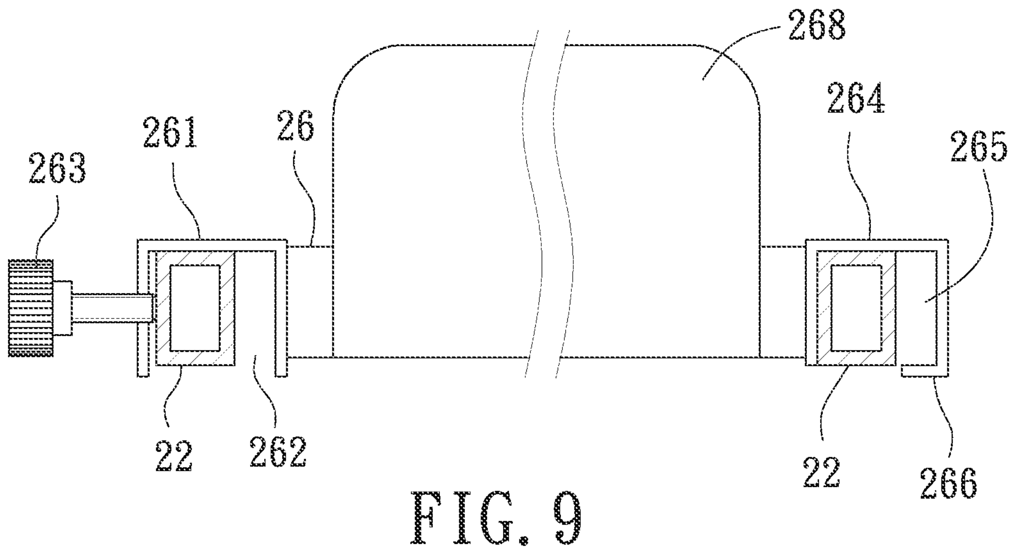
FIG. 9 is a partial cross-sectional view of the prone position ventilation health bed in accordance with the preferred embodiment of the present invention.
Figure 10:
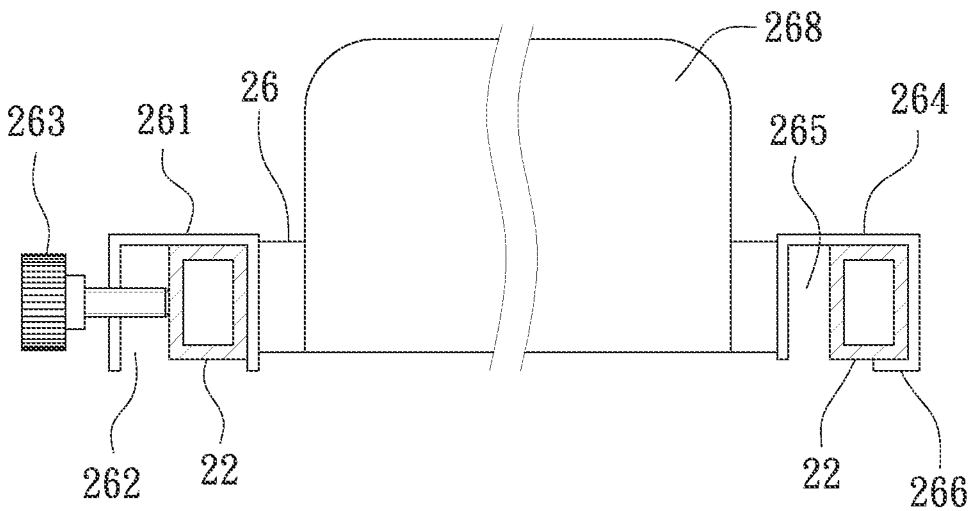
FIG. 10 is a schematic operational view of the prone position ventilation health bed as shown in FIG. 9.

Before the third fastening bolt 263 presses one of the two fixed bars 22, the third limit piece 266 is spaced from the other one of the two fixed bars 22 as shown in FIG. 9. When the third fastening bolt 263 presses one of the two fixed bars 22, the right chest and abdomen support rack 26 is driven and moved by the third fastening bolt 263 so that the third limit piece 266 is located under the other one of the two fixed bars 22 as shown in FIG. 9, and the right chest and abdomen support rack 26 is limited and supported.

In the preferred embodiment of the present invention, the left chest and abdomen support rack 25 is provided with two first branches 257 arranged transversely and directed rightward. A first breathable pad (or cushion) 258 covers a middle of the left chest and abdomen support rack 25 and the two first branches 257. The first breathable pad 258 is made of high density foam cotton coated with an air permeable jacket. In addition, the right chest and abdomen support rack 26 is provided with two second branches 267 arranged transversely and directed leftward. A second breathable pad (or cushion) 268 covers a middle of the right chest and abdomen support rack 26 and the two second branches 267. The second breathable pad 268 is made of high density foam cotton coated with an air permeable jacket.

In the preferred embodiment of the present invention, the front crossbar 212 is provided with two third branches 2121 arranged longitudinally and directed backward. A third breathable pad (or cushion) 2122 covers a middle of the front crossbar 212 and the two third branches 2121. The third breathable pad 2122 is made of high density foam cotton coated with an air permeable jacket. In addition, the head and face support rack 23 is provided with two fourth branches 237 arranged longitudinally and directed forward. A fourth breathable pad (or cushion) 238 covers a middle of the head and face support rack 23 and the two fourth branches 237. The fourth breathable pad 238 is made of high density foam cotton coated with an air permeable jacket.

In the preferred embodiment of the present invention, each of the two side bars 211, the front crossbar 212, and the two parallel fixed bars 22 is a rectangular pipe. Each of the first receiving groove 232 of the head and face support rack 23, the second receiving groove 252 of the left chest and abdomen support rack 25, and the third receiving groove 262 of the right chest and abdomen support rack 26 has a rectangular shape. Thus, a gap is axially defined between one of the two side bars 211 and the first receiving groove 232 of the head and face support rack 23 as shown in FIG. 5, between one of the two fixed bars 22 and the second receiving groove 252 of the left chest and abdomen support rack 25 as shown in FIG. 7, and between one of the two fixed bars 22 and the third receiving groove 262 of the right chest and abdomen support rack 26 as shown in FIG. 9.

In the preferred embodiment of the present invention, the stand 11 of the rear bedstead 10 has a front transversely provided with a connecting bar (or rack) 111, and a movable table 14 is detachably mounted on the connecting bar 111. The movable table 14 has a front portion provided with two legs 141 and a rear portion provided with two fixed members 142. The two fixed members 142 are fixed on the connecting bar 111.

In the preferred embodiment of the present invention, the rear bedstead 10 includes a rectangular hollow portion 121, two support rods 122 mounted in the hollow portion 121, and a cover plate 13 covering the hollow portion 121 and supported by the two support rods 122. The cover plate 13 has a shape corresponding to that of the hollow portion 121. The cover plate 13 has a top provided with a foldable handle 131.

In the preferred embodiment of the present invention, the rear bedstead 10 includes a bed board 12, a mattress 15 mounted on the bed board 12, and a secondary mattress 151 removably mounted on the bed board 12 and juxtaposed to the mattress 15. The hollow portion 121 is formed in a front of the bed board 12 and corresponds to the private parts (such groin, pussy or pudendum) of a user. The two support rods 122 are arranged in the hollow portion 121 longitudinally.

In the preferred embodiment of the present invention, a gap is axially defined between one of the two side bars 211 and the first receiving slot 235 of the head and face support rack 23 as shown in FIG. 5, between one of the two fixed bars 22 and the second receiving slot 255 of the left chest and abdomen support rack 25 as shown in FIG. 7, and between one of the two fixed bars 22 and the third receiving slot 265 of the right chest and abdomen support rack 26 as shown in FIG. 9.

Figure 11:
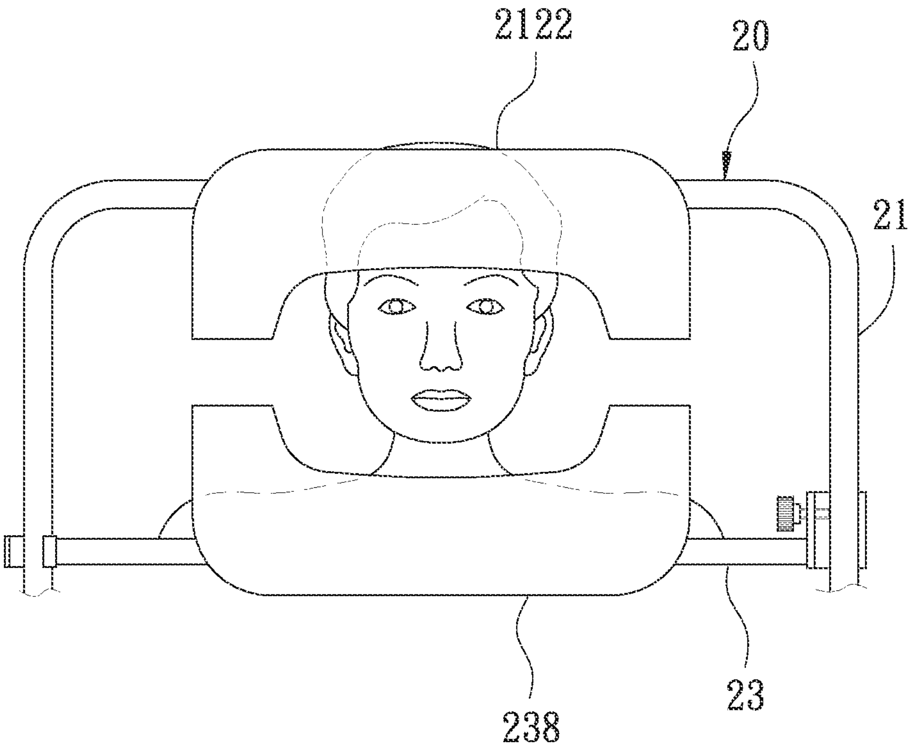
FIG. 11 is a schematic operational view showing a prone position of the user's head and face.
Figure 12:
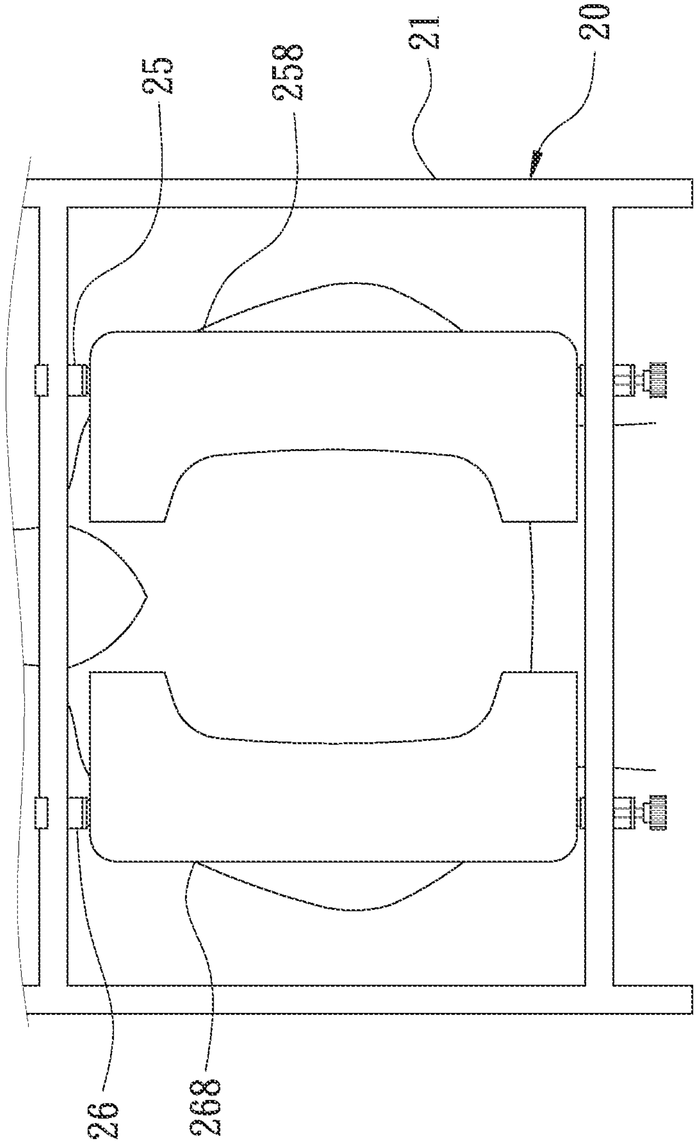
FIG. 12 is a schematic operational view showing a prone position of the user's chest and abdomen.

In operation, referring to FIGS. 11 and 12 with reference to FIGS. 1-10, when the user is situated at a prone position, the head and face support rack 23 is moved to adjust the distance between the head and face support rack 23 and the front crossbar 212 so that the user's forehead and shoulder rest on the fourth breathable pad 238 of the head and face support rack 23 and the third breathable pad 2122 of the front crossbar 212 as shown in FIG. 11. In such a manner, the user's face is exposed outward and not pressed. Then, the left chest and abdomen support rack 25 and the right chest and abdomen support rack 26 are moved to adjust the distance between the left chest and abdomen support rack 25 and the right chest and abdomen support rack 26 so that the two sides of the user's body rest on the first breathable pad 258 of the left chest and abdomen support rack 25 and the second breathable pad 268 of the right chest and abdomen support rack 26 as shown in FIG. 12. In such a manner, the user's chest and abdomen are exposed outward and not pressed.

Accordingly, the prone position ventilation health bed in accordance with the preferred embodiment of the present invention can be used to avoid pressure ulcers (or sores or wounds) caused by the prone position. The pressure ulcers are mainly located on the head, face, chest and abdomen. In the prone position ventilation health bed, the user's head, face, chest, and abdomen are exposed outward and will not be pressed to prevent from incurring a "pressure injury" caused by compressing the head, face, chest and abdomen. Thus, the user's head, face, chest, and abdomen are exposed outward without being pressed when the user is situated at the prone position, to provide a comfortable sensation to the user. In such a manner, the distance between the head and face support rack 23 and the front crossbar 212 is adjusted to fit the user's head and face, and the distance between the left chest and abdomen support rack 25 and the right chest and abdomen support rack 26 is adjusted to fit the user's chest and abdomen.

In the present invention, the gap of the head and the face is adjusted by the head and face support rack 23, and the gap of the chest and the abdomen is also adjusted by the left chest and abdomen support rack 25, and the right chest and abdomen support rack 26. In addition, the head and face support rack 23, the left chest and abdomen support rack 25, and the right chest and abdomen support rack 26 are respectively pressed by the first fastening bolt 233, the second fastening bolt 253, and the third fastening bolt 263, and are respectively supported by the first limit piece 236, the second limit piece 256, and the third limit piece 266, so that the head and face support rack 23, the left chest and abdomen support rack 25, and the right chest and abdomen support rack 26 are secured exactly without being loosened.

Figure 13:
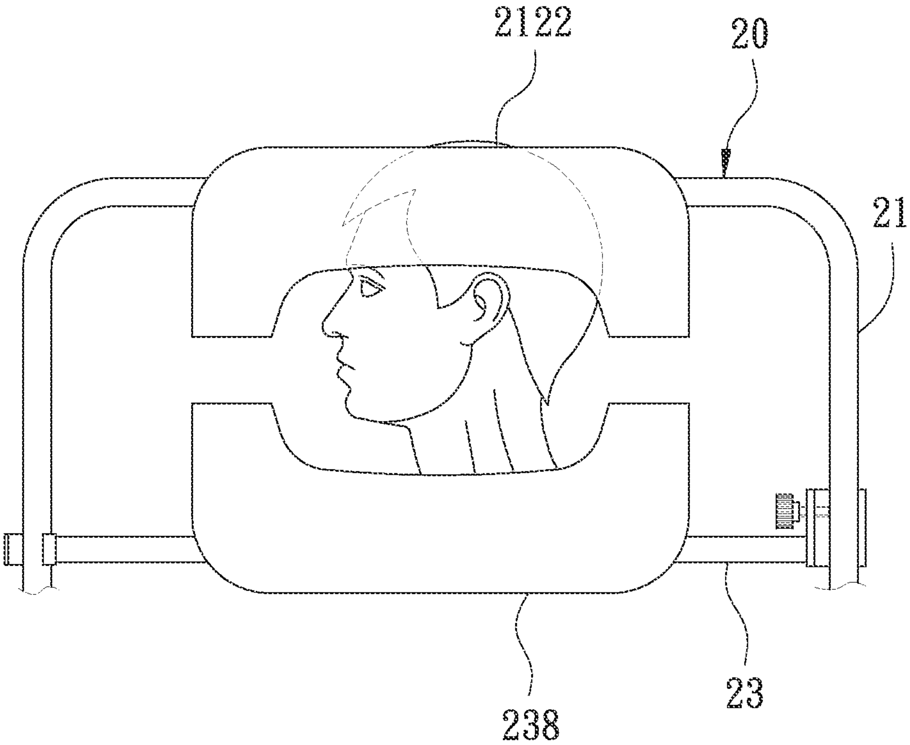
FIG. 13 is a schematic operational view showing a side sleeping position of the user's head and face.

Alternatively, referring to FIG. 13 with reference to FIGS. 1-10, when the user is situated at a side sleeping position, the user's ear, face and neck are disposed in a gap defined between the head and face support rack 23 and the front crossbar 212 and will not be pressed.

In addition, the movable table 14 is connected with the connecting bar 111 to allow placement of articles and to facilitate the user reading books and using a mobile phone or tablet computer.

Further, a container is placed under the hollow portion 121. Thus, when the user wants to urinate or defecate, the secondary mattress 151 and the cover plate 13 are removed from the bed board 12, and the container is exposed from the hollow portion 121, so that the user can defecate without having to get out of the bed. The user's hands are supported by the two support rods 122.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A prone position ventilation health bed comprising:

a rear bedstead and a front bedstead;

the rear bedstead has a bottom provided with a stand;

the front bedstead is pivotally connected with a front portion of the rear bedstead;

the front bedstead includes a frame;

the frame includes two side bars and a front crossbar connecting the two side bars;

the front crossbar is located at a front end of each of the two side bars;

the two side bars and the front crossbar construct a rectangular structure;

two parallel fixed bars are transversely mounted between the two side bars;

a head and face support rack is transversely arranged between the front crossbar and one of the two fixed bars;

the head and face support rack is movable between the front crossbar and one of the two fixed bars;

the head and face support rack has a first end provided with a first securing member provided with a first receiving groove mounted on one of the two side bars;

the first receiving groove is formed in the first securing member longitudinally and has an opening directed downward;

a first fastening bolt extends through the first securing member axially and is moved to press one of the two side bars so that the head and face support rack is fixed;

the head and face support rack has a second end longitudinally provided with a first limit member provided with a first receiving slot mounted on the other one of the two side bars;

the first receiving slot is formed in the first limit member longitudinally and has an opening directed downward;

the first limit member has a bottom provided with a first limit piece arranged transversely and directed inward;

when the first fastening bolt presses one of the two side bars, the first limit piece is located under the other one of the two side bars, and the head and face support rack is limited;

a left chest and abdomen support rack and a right chest and abdomen support rack are longitudinally arranged between the two fixed bars;

the left chest and abdomen support rack and the right chest and abdomen support rack are parallel with each other and are movable between the two fixed bars;

the left chest and abdomen support rack has a first end provided with a second securing member provided with a second receiving groove mounted on one of the two fixed bars;

the second receiving groove is formed in the second securing member transversely and has an opening directed downward;

a second fastening bolt extends through the first second securing member axially and is moved to press one of the two fixed bars so that the left chest and abdomen support rack is fixed;

the left chest and abdomen support rack has a second end transversely provided with a second limit member provided with a second receiving slot mounted on the other one of the two fixed bars;

the second receiving slot is formed in the second limit member transversely and has an opening directed downward;

the second limit member has a bottom provided with a second limit piece arranged longitudinally and directed inward;

when the second fastening bolt presses one of the two fixed bars, the second limit piece is located under the other one of the two fixed bars, and the left chest and abdomen support rack is limited;

the right chest and abdomen support rack has a first end provided with a third securing member provided with a third receiving groove mounted on one of the two fixed bars;

the third receiving groove is formed in the third securing member transversely and has an opening directed downward;

a third fastening bolt extends through the first third securing member axially and is moved to press one of the two fixed bars so that the right chest and abdomen support rack is fixed;

the right chest and abdomen support rack has a second end transversely provided with a third limit member provided with a third receiving slot mounted on the other one of the two fixed bars;

the third receiving slot is formed in the third limit member transversely and has an opening directed downward;

the third limit member has a bottom provided with a third limit piece arranged longitudinally and directed inward; and when the third fastening bolt presses one of the two fixed bars, the third limit piece is located under the other one of the two fixed bars, and the right chest and abdomen support rack is limited.

2. The prone position ventilation health bed as claimed in claim 1, wherein:

the left chest and abdomen support rack is provided with two first branches arranged transversely and directed rightward;

a first breathable pad covers a middle of the left chest and abdomen support rack and the two first branches;

the right chest and abdomen support rack is provided with two second branches arranged transversely and directed leftward; and a second breathable pad covers a middle of the right chest and abdomen support rack and the two second branches.

3. The prone position ventilation health bed as claimed in claim 2, wherein:

the front crossbar is provided with two third branches arranged longitudinally and directed backward;

a third breathable pad covers a middle of the front crossbar and the two third branches;

the head and face support rack is provided with two fourth branches arranged longitudinally and directed forward; and a fourth breathable pad covers a middle of the head and face support rack and the two fourth branches.

4. The prone position ventilation health bed as claimed in claim 1, wherein:

each of the two side bars, the front crossbar, and the two parallel fixed bars is a rectangular pipe;

each of the first receiving groove of the head and face support rack, the second receiving groove of the left chest and abdomen support rack, and the third receiving groove of the right chest and abdomen support rack has a rectangular shape; and a gap is axially defined between one of the two side bars and the first receiving groove of the head and face support rack, between one of the two fixed bars and the second receiving groove of the left chest and abdomen support rack, and between one of the two fixed bars and the third receiving groove of the right chest and abdomen support rack.

5. The prone position ventilation health bed as claimed in claim 1, wherein the stand of the rear bedstead has a front transversely provided with a connecting bar, and a movable table is detachably mounted on the connecting bar.

6. The prone position ventilation health bed as claimed in claim 1, wherein the rear bedstead includes a rectangular hollow portion, two support rods mounted in the hollow portion, and a cover plate covering the hollow portion and supported by the two support rods, and the cover plate has a top provided with a foldable handle.

* * * * *